United States Patent Office 3,515,788
Patented June 2, 1970

3,515,788
ANTI-TUBERCULAR COMPOSITIONS AND METHODS EMPLOYING PYRIDINE DERIVATIVES
Albrecht Edenhofer, Riehen, Henri Ramuz, Birsfelden, and Hans Spiegelberg, Basel, Switzerland, assignors to Hoffmann-La Roche Inc., Nutley, N.J., a corporation of New Jersey
No Drawing. Filed Nov. 9, 1967, Ser. No. 681,914
Claims priority, application Switzerland, Nov. 23, 1966, 16,802/66
Int. Cl. A61k 27/00
U.S. Cl. 424—263
22 Claims

ABSTRACT OF THE DISCLOSURE

Certain benzophenones substituted by a 3-pyridyl-2-hydroxypropoxy group or a 3-pyrazinyl-2-hydroxypropoxy group were found to possess useful activity against mycobacterial infections particularly against *Mycobacterium tuberculosis*.

BRIEF SUMMARY OF THE INVENTION

This invention relates to a method of treating mycobacterial infections and to novel pharmaceutical compositions useful therein. More particularly, the present invention relates to a method for the treatment of tuberculosis and to novel anti-tubercular compositions containing as active ingredient a substituted benzophenone of the formula

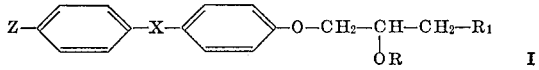

wherein Z is halogen or nitro; X is carbonyl, hydroxymethylene, di-lower alkoxymethylene or lower alkylenedioxymethylene; R is hydrogen or an acyl group; and $R_1$ is a wholly or partially hydrogenated N-pyridyl or N-pyrazinyl group substituted in para-position with phenyl, halophenyl or lower alkoxyphenyl and pharmaceutically acceptable acid addition salts thereof.

DETAILED DESCRIPTION

Compounds of Formula I above have been found to be active against mycobacterium. More specifically, they have been found to be active against *Mycobacterium tuberculosis* commonly known as tubercle bacillus, which is the etiologic agent of the infectious disease tuberculosis found in cattle and humans. In animals compounds of Formula I have demonstrated tuberculostatic properties. Thus, a comprehensive embodiment of the present invention comprises the use of a compound of Formula I in the treatment and control of tuberculosis in animals. Compounds of Formula I may also be employed against strains of *Mycobacterium tuberculosis* which have developed resistance to other anti-tubercular agents.

In another particular embodiment the present invention comprises pharmaceutical compositions containing as an active ingredient a compound of Formula I in a form suitable for enteral or parenteral administration. In general, compounds of Formula I have been found to be active against *Mycobacterium tuburculosis* in vivo at doses of about 3 mg./kg. and higher. For example, 4-fluoro - 4' - {3 - [4-(p-fluorophenyl)-3,6-dihydro-1(2H)-pyridyl]-2-hydroxypropoxy}benzophenone which has an $LD_{50}$ of 1875 mg./kg. orally in mice is active against *Mycobacterium tuberculosis* in mice at a dose of 3.4 mg./kg. administered in the diet; 4-chloro-4'-{3-[4-(p-chlorophenyl) - 3,6 - dihydro-1(2H)-pyridyl]-2-hydroxypropoxy}benzophenone which has an $LD_{50}$ of >5000 mg./kg. orally in mice is active against *Mycobacterium tuberculosis* in mice at a dose of 3.4 mg./kg. in the diet; and 4-bromo-4' - [3-(3,6-dihydro-4-phenyl-1(2H) - pyridyl)dyl)-2-hydroxypropoxy]benzophenone which has an $LD_{50}$ of 1875 mg./kg. orally in mice is active against *Mycobacterium tuberculosis* in mice at a dose of 13 mg./kg. in the diet. Tests in warm blooded animals thus demonstrate that the compounds of Formula I can be effectively employed in the therapy of tuberculosis in the same general manner as the previously known anti-tubercular agent isoniazid. This latter compound which has an $LD_{50}$ of 203 mg./kg. orally in mice exhibits activity against *Mycobacterium tuberculosis* when tested in mice in the same general manner as the compounds of this invention at doses of about 5 mg./kg. in the diet. The compounds of Formula I and pharmaceutical compositions thereof have been shown to have a pattern of activity qualitatively similar to the anti-tubercular agents of known clinical efficacy and are effective as anti-tubercular agents in the treatment of tuberculosis in animals.

Componds of Formula I wherein X is carbonyl and R is hydrogen can be prepared by reacting a compound of the general formula

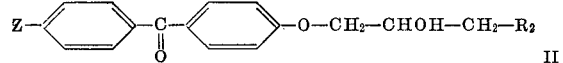

wherein Z is halogen or nitro; and $R_2$ is halogen or a similar leaving group such as, for example, alkyl or ar-alkyl sulfonyloxy or $R_2$ and the hydroxymethylene group to which it is attached together represent the group

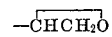

or a ketal of a compound of Formula I with a compound of the formula

H—$R_1$                     III in which $R_1$ has the same meaning as hereinabove.

Alternatively, the compounds of Formula I wherein X is carbonyl and R is hydrogen can be prepared by reacting a compound of the general formula

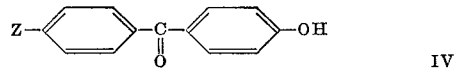

wherein Z has the same meaning as above or a ketal thereof with a compound of the formula $R_3$—$CH_2$—CHOH—$CH_2$—$R_1$      V wherein $R_1$ has the same meaning as hereinabove; and $R_3$ is halogen or a similar leaving group, for example, an alkyl or aralkyl sulfonyloxy group or $R_3$ and the hydroxymethylene group to which it is attached together represent the group

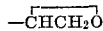

Compounds of Formula I wherein R is acyl can be obtained from compounds of Formula I wherein R is hydrogen by the usual esterification methods. Compounds of Formula I wherein X is hydroxymethylene can be obtained from compounds of Formula I wherein X is carbonyl by conventional reduction methods. Compounds of Formula I wherein X is carbonyl can also be converted to the corresponding ketals by methods which are per se well known in the art. The compounds of Formula I can be converted to their acid addition salts by known techniques or they can be split into their optical isomers by conventional separation methods.

The term "halogen" as used herein includes all four halogens, i.e., fluorine, chlorine, bromine and iodine. Of these, fluorine, chlorine and bromine are preferred. The term "acyl" as used herein represents the acid moiety of an organic, aliphatic or aromatic acid such as acetic acid, benzoic acid and the like. The preferred acyl groups are the lower alkanoic and substituted lower alkanoic acid groups particularly acetyl, phenoxyacetyl or para-chlorophenoxyacetyl. The term "lower alkoxy" as used herein represents a saturated aliphatic hydrocarbon ether group containing 1 to 7 carbon atoms. A preferred lower alkoxy group is the methoxy group. Pyridyl and pyrazinyl groups of this invention are wholly or partially hydrogenated. Suitable groups are, for example, the dihydropyridyl, tetrahydropyridyl, piperidyl, dihydropyrazinyl, tetrahydropyrazinyl and piperazinyl.

The active substances of this invention, i.e., the compounds of Formula I, can exist in two optically isomeric forms. It is intended to include among the active compounds of this invention both isomeric forms as well as racemic mixtures thereof. The optically active isomeric forms can be separated according to the usual techniques. The active substances of Formula I can be obtained as their free bases or as acid addition salts thereof. Suitable acid addition salts are salts with pharmaceutically acceptable inorganic or organic acids, for example, salts with hydrohalic acids such as hydrochloric acid, hydrobromic acid, etc., or sulfuric acid, or for example, salts with organic acids such as benzoic acid, acetic acid, tartaric acid, citric acid, lactic acid and the like.

The anti-tubercular benzophenone derivatives of this invention can also be employed in the form of their ketals. The ketals are represented by compounds of Formula I wherein X is di-lower alkoxymethylene or alkylenedioxymethylene. The ketals of lower alcohols or glycols, for example, ketals of methyl alcohol, ethyl alcohol or ethylene glycol, are preferred.

Compounds of formulas

The following compounds have been found to be particularly active against *Mycobacterium tuberculosis*:

4-chloro-4'-{3-[4-(p-chlorophenyl)-3,6-dihydro-1(2H)-pyridyl]-2-hydroxypropoxy}benzophenone
4-bromo-4'-{3-[4-(p-chlorophenyl)-1-piperazinyl]-2-hydroxypropoxy}benzophonone
4-bromo-4'-[3-(3,6-dihydro-4-phenyl-(2H)-pyridyl)-2-hydroxypropoxy]benzophenone
4-bromo-4'-[2-hydroxy-3-(4-phenyl-1-piperazinyl)-propoxyl]benzophenone
4-bromo-4'-{3-[4-(p-fluorophenyl)-3,6-dihydro-1(2H)-pyridyl]-2-hydroxypropoxy}benzophenone
4-bromo-4'-{2-hydroxy-3-[4-(p-methoxyphenyl)-1-piperazinyl]propoxy}benzophenone
1-{[p-(p-chlorobenzoyl)phenoxy]methyl}-2-[3,6-dihydro-4-phenyl-1(2H)-pyridyl]ethyl(p-chlorophenoxy)acetate
rac.-4-bromo-4'-[3-(3,6-dihydro-4-phenyl-1(2H)-pyridyl)-2-hydroxpropoxy]benzhydrol
4-bromo-4'-{2-hydroxy-3-[4-(m-methoxyphenyl)-1-piperazinyl]propoxy}benzophenone
4-fluoro-4'-{3-[4-(p-fluorophenyl)-3,6-dihydro-1(2H)-pyridyl]-2-hydroxypropoxy}benzophenone
4-bromo-4'-{3-[4-(p-chlorophenyl)-3,6-dihydro-1(2H)-pyridyl]-2-hydroxypropoxy}benzophenone
4-bromo-4'-{3-[4-(p-bromophenyl)-3,6-dihydro-1(2H)-pyridyl]-2-hydroxypropoxy}benzophenone
4-chloro-4'-[3-(3,6-dihydro-4-phenyl-1(2H)-pyridyl)-2-hydroxypropoxy]benzophenone
rac.-4-{3-[4-(p-fluorophenyl)-3,6-dihydro-1(2H)-pyridyl]-2-hydroxypropoxy}-4'-nitrobenzophenone
rac.-4-{3-[4-(p-chlorophenyl)-3,6-dihydro-1(2H)-pyridyl]-2-hydroxypropoxy}-4'-nitrobenzophenone
rac.-4-bromo-4'-[2-hydroxy-3-(4-phenylpiperidino)-propoxy]benzophenone
4-chloro-4'-{3-[4-(o-chlorophenyl)-1-piperazinyl]-2-hydroxypropoxy}benzophenone.

The benzophenone derivatives employed as active ingredients in the compositions of this invention are generally colorless or white to yellow crystalline solids which have basic properties and relatively high melting points and can be conveniently prepared in the form of their acid addition salts. The bases are relatively insoluble in water though soluble in organic solvents such as alcohol and ether. The salts are characteristically crystalline solids soluble in water. Both the bases and their acid addition salts are stable under ordinary conditions and suffer no breakdown when formulated into the novel compositions of the invention by the usual techniques for compounding ordinarily employed in the art.

The novel products and processes contemplated by this invention include both enteral and parenteral compositions, e.g., compositions for oral administration, compositions for injection or infusion, suppositories, etc. and methods of administration thereof to animals. The pre-

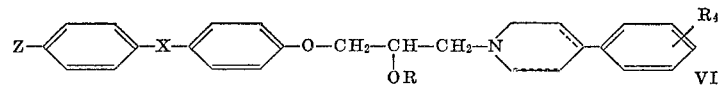

and

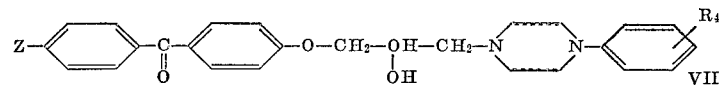

wherein Z, X and R have the same meaning as hereinabove; the dotted lines represent either a single or double bond; and $R_4$ is halogen or lower alkoxy constitute a preferred group. Especially preferred are the compounds of Formula VI above wherein X represents the carbonyl group; Z is halogen; and R is hydrogen.

ferred compositions of this invention are the forms suitable for oral administration. Such oral forms are suitably prepared for administration in unit dosage form, such as tablets, pills, capsules, granules and the like. For preparing the solid compositions, such as tablets, the principal active ingredient is mixed with conventional tablet ingredients such as corn starch, lactose, sucrose, sorbitol, talc, stearic acid, magnesium stearate, dicalcium phosphate and functionally similar materials employed as pharmaceutical diluents or carriers. The tablets or pills of the novel compositions can be laminated or otherwise compounded to provide a dosage form, affording the advantage of prolonged or delayed action or predetermined successive action of the enclosed medication or they can be compounded for instant release of the active ingredient. For example, the tablet or pill can comprise an inner dosage and an outer dosage component, the latter being in the form of an envelope over the former. The two components can be separated by an enteric layer which serves to resist disintegration in the stomach thereby permitting the inner component to pass intact into the intestinal tract or simply to be delayed in release. A variety of materials can be used for such enteric layers or coatings; such materials include, for example, a number of polymeric acids or mixtures of polymeric acids such as shellac, shellac and cetyl alcohol, cellulose acetate and the like. For oral administration the active ingredients of Formula I are employed in daily amounts of about 10 mg. to about 250 mg. per kilogram of body weight. A preferred unit dosage form is a tablet containing 10 to 50 mg. of the active benzophenone derivative or its nontoxic salt. Tablets scored to be broken into dosage units or fractional doses, if desired, or a number of tablets to be taken at one time to constitute a dosage unit may also be employed.

A second preferred dosage unit form is a capsule containing from 10 to 50 mg. of the active benzophenone derivative of Formula I or its nontoxic salt. The capsule may be either of the hard or soft shell variety and may be made of any suitable capsule material which will disintegrate in the digestive tract within 1–5 hours. Typical encapsulating materials suitable for use in the practice of this invention are, for example, gelatin, methyl cellulose, etc.

The dosage forms of this invention suited to parenteral administration are the liquid forms in which the active benzophenone derivative of Formula I or a salt thereof is incorporated into an aqueous or organic solution by dissolving or suspending in an appropriate solvent which is suitable for parenteral administration. Parenteral compositions are ordinarily formulated with less than the active benzophenone derivatives than in the case of the oral forms. Suitable dosage forms for parenteral administration will ordinarily contain from about .5 to 10 mg. of the active benzophenone of Formula I dissolved or suspended in about 1 cc. of solution suitable for parenteral administration. The parenteral forms can be administered by injection intravenously, intramuscularly or intrapleurally into fistulae or other infected areas or by infusion, e.g., intravenously into infected cavities and plural spaces.

The suitable daily dose will be about 1 to 15 mg./kg. given in 2 or 3 divided doses. For infusion the indicated dose is suitably obtained by preparing a solution containing .1 to 10 percent of the active benzophenone of Formula I and administering at a rate of 1 to 5 ml. per minute.

The term "dosage unit form" as employed throughout this specification refers to pharmaceutically discrete units suitable as unitary dosages for mammalian subjects each containing a predetermined quantity of active material calculated to produce the desired therapeutic effect in association with the required pharmaceutical carrier, diluent or vehicle. This invention also comprehends other forms suitable for enteral administration such as suppositories and also aerosols for inhalation therapy. The specifications for the novel dosage unit forms of this invention are dictated by the characteristics of the active material and the particular therapeutic effect to be achieved and by the limitations inherent in the art of compounding such an active material for therapeutic use in animals.

The dosage unit forms of this invention containing a benzophenone derivative of Formula I or a pharmaceutically acceptable acid addition salt thereof may also contain either inert or other medicinally active materials. For instance, when the dosage unit form is a tablet or granule, there may also be present various binders, fillers or solid carrier or diluent materials. When the dosage unit form is a capsule, it may contain in addition to additive or diluent materials a liquid carrier such as a fatty oil. When the dosage unit form is a liquid, it can, for example, be in sterile aqueous solution or in physiological saline solution and the like. There may also be present, regardless of the dosage unit form, various flavors and other conventional excipients such as preservatives, stabilizers, wetting or emulsifying agents, salts for varying the osmotic pressure, buffers and the like. The diluent or carrier materials employed in compounding the pharmaceutical formulations of this invention can be of the organic or inorganic variety ordinarily employed in formulating compositions suitable for enteral or parenteral administration. It will be understood, of course, the any materials used in preparing dosage unit forms must be substantially nontoxic in the amounts employed for the administration of the required amount of the benzophenone derivative of Formula I which will ordinarily comprise from about 1 to 50 percent of the dosage form. The novel compositions can include or be administered in conjunction with other anti-tubercular agents to obtain advantageous combinations of their properties, e.g. they can be administered in combination with such known anti-tubercular agents as isoniazid, p-aminosalicylic acid or streptomycin. When the active ingredients of this invention are administered in conjunction with known anti-tubercular agents, they can be administered by the same or different routes as indicated herebefore.

As indicated hereinabove, the effective dose of the compounds of Formula I under ordinary circumstances is between about 10 mg. and 250 mg./kg. of body weight. Effective dosages will, of course, depend in all instances upon the severity and individual characteristics of each case as determined by the prescribed practitioner and upon the use or nonuse of other therapy. It will be understood that dosage forms containing larger or smaller quantities of the active drug ingredient are encompassed by the scope of this invention and that such dosage forms can be administered more or less frequently than indicated heretofore. It will be understood that dosage forms containing inert adjuvants in quantities that are greater or less than those indicated above as well as in the exemplars in the examples which follow are also encompassed by this invention.

The novel compositions of this invention as stated above are useful in the treatment of tuberculosis and are highly efficacious in combating tuberculosis infections when administered either orally to the infected subject or administered directly to the locus of infection. In tests on mice the anti-tuberculosis agents of this invention were found to be efficacious when administered in the diet in amounts such that the average daily intake was about 30 mg. to about 200 mg./kg. of body weight. The test method employed and the results obtained were as follows.

Groups of 8 to 10 mice are used. There are two control groups, both of which are infected. One of the control groups remains untreated while the second control group is treated with a known active anti-tubercular agent, isonicotinic acid hydrazide. The infection consists of an intravenous injection of a 1:10 dilution in saline of a week-old Dubos culture of *Mycobacterium tuberculosis* H 37 RV. Treatment begins immediately after infection and continues daily for 3 weeks. On the twenty-second day the lungs are removed from each animal and then placed in formaldehyde for 3 to 4 days to make the lesions more pronounced. The lesions are rated from 0 (none) to 4+ (widespread) and the dose necessary to cure 50 percent of the infected animals ($CD_{50}$) is calculated by the method of Reed and Muench, American Journal of Hygiene, 27: 493, 1938.

| Compound | $CD_{50}$ (mg./kg. diet) | $LD_{50}$ p.o. in mice 24 hr. observation (mg./kg.) |
|---|---|---|
| 4-bromo-4'-[3-(3,6-dihydro-4-phenyl-1-(2H)-pyridyl)-2-hydroxypropoxy]benzophenone | 13 | 1,875 |
| 4-bromo-4'-{3-[4-(p-chlorophenyl)-3,6-dihydro-1(2H)-pyridyl]-2-hydroxypropoxy}-benzophenone | 6 | >5,000 |
| 4-bromo-4'-{3-[4-(p-bromophenyl)-3,6-dihydro-1(2H)-pyridyl]-2-hydroxypropoxy}-benzophenone | 9.1 | >5,000 |
| 4-bromo-4'-{3-[4-(p-chlorophenyl)-1-piperazinyl]-2-hydroxypropoxy}benzophenone | 6 | >5,000 |
| 4-bromo-4'-[2-hydroxy-3-(4-phenyl-1-piperazinyl)-propoxy]benzophenone | 15 | >5,000 |
| 4-fluoro-4'-{3-[4-(p-fluorophenyl)-3,6-dihydro-1(2H)-pyridyl]-2-hydroxypropoxy}-benzophenone | 3.4 | 1,875 |
| 4-chloro-4'-{3-[4-(p-chlorophenyl)-3,6-dihydro-1(2H)-pyridyl]-2-hydroxypropoxy}-benzophenone | 3.4 | >5,000 |
| 4-chloro-4'-[3-(3,6-dihydro-4-phenyl-1(2H)-pyridyl)-2-hydroxypropoxy]benzophenone | 12 | 900 |
| 4-bromo-4'-{2-hydroxy-3-[4-(m-methoxyphenyl)-1-piperazinyl]propoxy}-benzophenone | 27 | >5,000 |
| 4-bromo-4'-{2-hydroxy-3-[4-(p-methoxyphenyl)-1-piperazinyl]propoxy}-benzophenone | 21 | >5,000 |
| 1-{[p-(p-chlorobenzoyl)-phenoxy]methyl}-2-[3,6-dihydro-4-phenyl-1(2H)-pyridyl]ethyl(p-chlorophenoxy)acetate | 22 | 3,750 |
| Rac.-4-bromo-4'-[3-(3,6-dihydro-4-phenyl-1(2H)-pyridyl)-2-hydroxypropoxy]-benzhydrol | 22 | 900 |
| Rac.-4-{3-[4-(p-fluorophenyl)-3,6-dihydro-1(2H)-pyridyl]-2-hydroxypropoxy}-4'-nitrobenzophenone | 14 | >5,000 |
| Rac.-4-{3-[4-(p-chlorophenyl)-3,6-dihydro-1(2H)-pyridyl]-2-hydroxypropoxy}-4'-nitrobenzophenone | 42 | >5,000 |
| Rac.-4-bromo-4'-[2-hydroxy-3-(4-phenylpiperidino)propoxy]-benzophenone | 57 | 225 |
| 4-chloro-4'-{3-[4-(o-chlorophenyl)-1-piperazinyl]-2-hydroxypropoxy}benzophenone | 339 | >5,000 |

The invention will be more fully understood from the examples which follow. These examples are illustrative of the invention and are not to be construed as limitative thereof.

EXAMPLE 1

The preparation of the benzophenone derivatives employed as the active ingredient in the novel compositions and methods of this invention is illustrated by the following exemplary preparative procedures.

15.7 g. of 4-[2,3-epoxypropoxy]-4'-bromobenzophenone was dissolved in 50 ml. of dioxane and after the addition of 8.0 g. of 4-phenyl-1,2,3,6-tetrahydropyridine, the mixture was heated under reflux for 5 hours. The solvent was subsequently evaporated off under reduced pressure. The 4-[3-(3,6-dihydro-4-phenyl-1(2H-pyridyl)-2-hydroxypropoxy] - 4' - bromobenzophenone which remained was dissolved in 20 mil. of ethanol and acidified with ethanolic hydrochloric acid to an acidity indicated by Congo red. The hydrochloride which separated out as a crystalline solid melted at 210–212° C. after recrystallization from ethanol.

The following compounds were also obtained in analogy to the above procedure:

4 - bromo-4' - {3 - [4-(-p-fluorophenyl)-3,6-dihydro-1 (2H) - pyridyl] - 2 - hydroxypropoxy}benzophenone hydrochloride, M.P. 233° C., obtained by employing as starting material 4-(2,3-epoxypropoxy)-4'-bromobenzophenone and 4-p-fluorophenyl-1,2,3,6-tetrahydropyridine;

4 - chloro - 4'-{3 - [4-(p-chlorophenyl)-3,6-dihydro-1 (2H) - pyridyl]-2-hydroxypropoxy}benzophenone hydrochloride, M.P. 212° C. (with degradation), obtained by employing as starting material 4-(2,3-epoxypropoxy-4'-chlorobenzophenone and 4-(p-chlorophenyl)-1,2,3,6-tetrahydropyridine;

4 - bromo - 4' - {3 - [4 - (p - chlorophenyl) - 1 - piperazinyl]-2-hydroxypropoxy}benzophenone, M.P. 179–182° C., obtained by employing as starting material 4-[2,3-epoxypropoxy]-4'-bromobenzophenone and 1-(p-chlorophenyl)piperazine;

4 - bromo - 4' - [2 - hydroxy - 3 - (4 - phenyl - 1 - piperazinyl)propoxy]benzophenone, M.P. 169–173° C., obtained by employing as starting material 4-[2,3-epoxypropoxy] - 4' - bromobenzophenone and N - phenylpiperazine;

4 - bromo - 4' - {2 - hydroxy - 3 - [4 - (p - methoxyphenyl) - 1 - piperazinyl] - propoxy}benzophenone, M.P. 167–170° C., obtained by employing as starting material 4-[2,3-epoxypropoxy]-4'-bromobenzophenone and 1-(p-methoxyphenyl)piperazine;

4 - bromo - 4' - {2 - hydroxy - 3 - [4 - (m - methoxyphenyl) - 1 - piperazinyl] - propoxy}benzophenone, M.P. 149–151° C., obtained by employing as starting material 4-[2,3-epoxypropoxy]-4'-bromobenzophenone and 1-(m-methoxyphenyl)piperazine;

4 - fluoro - 4' - {3 - [4 - (p - fluorophenyl) - 3,6-dihydro-1(2H) - pyridyl] - 2 - hydroxypropoxy}benzophenone hydrochloride. M.P. 192–193° C., obtained by employing as starting material 4-(2,3-epoxypropoxy)-4'-fluorobenzophenone and 4-(p-fluorophenyl)-1,2,3,6-tetrahydropyridine;

4 - bromo - 4' - {3 - [4 - (p - chlorophenyl) - 3,6 - dihydro - 1(2H) - pyridyl] - 2 - hydroxypropoxy}benzophenone hydrochloride, M.P. 217° C., obtained by employing as starting material 4-(2,3-epoxypropoxy)-4'-bromobenzophenone and 4-(p-chlorophenyl)-1,2,3,6-tetrahydropyridine;

4 - bromo - 4' - {3 - [4 - (p - bromophenyl) - 3,6 - dihydro - 1(2H) - pyridyl] - 2 - hydroxypropoxy}benzophenone hydrochloride, M.P. 232–237° C., obtained by employing as starting material 4-(2,3-epoxypropoxy)-4'-bromobenzophenone and 4 - (p - bromophenyl) - 1,2,3,6-tetrahydropyridine;

4 - chloro - 4' - [3 - (3,6 - dihydro - 4 - phenyl - 1(2H)-pyridyl)-2-hydroxypropoxy]-benzophenone hydrochloride, M.P. 202° C., obtained by employing as starting material 4 - (2,3 - epoxypropoxy) - 4' - chlorobenzophenone and 4-phenyl-1,2,3,6-tetrahydropyridine;

4 - {3 - [4 - (p - fluorophenyl) - 3,6 - dihydro - 1(2H)-pyridyl] - 2-hydroxypropoxy}-4'-nitrobenzophenone, M.P. 154–155° C., obtained by employing as starting material 4-[2,3-epoxypropoxy] - 4' - nitrobenzophenone and 4-(p-fluorophenyl)-1,2,3,6-tetrahydropyridine.

Compounds of Formula I wherein R is an acyl group are prepared, for example, according to the following specific exemplar.

4.48 g. of 4-chloro-4'-[3-(3,6-dihydro-4-phenyl-1(2H)-pyridyl)-2-hydroxypropoxy]benzophenone and 1.38 g. of calcium carbonate were suspended in 50 ml. of acetone. Under heating and reflux a solution of 2.05 g. of p-chlorophenoxy acetic acid chloride in 10 ml. of acetone was added dropwise with stirring in the course of 20 minutes. After an additional 7 hours of heating with reflux the insolubles were filtered off. The solution was then evaporated to dryness and the residue crystallized from benbene. After a second recrystallization from ethyl acetate there was obtained 1-{[p-(p-chlorobenzoyl) phenoxy] methyl} - 2 - [3,6 - dihydro - 4 - phenyl - 1(2H) - pyridyl] ethyl(p-chlorophenoxy)acetate, M.P. 124–126° C.

The preparation of compounds of Formula I wherein X represents a hydroxymethylene group is illustrated by the following exemplary procedure.

4.7 g. of 4-bromo-4'-[3-(3,6-dihydro-4-phenyl-1(2H)-pyridyl) - 2 - hydroxypropoxy]benzophenone were suspended in 100 ml. of methanol and 1.24 g. of sodium acetate was added. Under vigorous stirring there was added dropwise a solution of 1.78 g. of sodium borohydride in 40 ml. of methanol. A clear solution was formed which, after the completion of the dropwise addition, was heated at reflux for 30 minutes. The solution was evaporated to dryness under vacuum and the residue was taken up in chloroform. The organic phase was extracted 5 times with 10 ml. of water each time, dried over potassium carbonate and concentrated by evaporating the solvent under vacuum. The residue was crystallized by the addition of absolute alcohol. Recrystallization from methanol gave racemic 4-bromo-4'-[3-(3,6-dihydro-4-phenyl - 1(2H) pyridyl)-2-hydroxypropoxy]benzhydrol melting at 113° C.

The products of Formula I which are obtained according to the foregoing procedures can also be transformed into their salts, ketals or isomers which can be employed as the active chemotherapeutic agent of the compositions and methods of this invention.

EXAMPLE 2

Manufacture of capsules of the following composition:

|  | Mg. |
|---|---|
| 4 - [3 - (3,6 - dihydro - 4 - phenyl - 1(2H) - pyridyl) - 2 - hydroxypropoxy] - 4' - bromobenzophenone or | |
| 4 - bromo - 4' - [2 - hydroxy - 3 - (4 - phenyl - 1-piperazinyl)propoxy]benzophenone hydrochloride or | |
| Rac. - 4 - bromo - 4' - [3 - (3,6 - dihydro - 4 - phenyl-1(2H) - pyridyl) - 2 - hydroxypropoxy]benzhydrol hydrochloride or | |
| 4 - fluoro - 4' - {3 - [4 - (p - fluorophenyl) - 3,6 - dihydro - 1(2H) - pyridyl] - 2 - hydroxypropoxy}-benzophenone hydrochloride | 10 |
| Lactose | 173 |
| Maize starch | 37 |
| Talcum | 5 |
| Per capsule | 225 |

The active substance is homogeneously mixed with the lactose and the maize starch, passed through a sieving machine and, after admixture of the talcum, filled into No. 4 gelatin capsules.

EXAMPLE 3

Manufacture of tablets of the following composition:

|  | Mg. |
|---|---|
| 4 - [3 - (4-(p-fluorophenyl)-3,6-dihydro-1(2H)-pyridyl) - 2 - hydroxypropoxy]-4'-bromobenzophenone hydrochloride or | |
| 4 - bromo - 4' - {2-hydroxy-3-[4-(p-methoxyphenyl)-1 - piperazinyl]propoxy}benzophenone hydrochloride or | |
| 4 - bromo-4'-{2-hydroxy-3-[4-(m-methoxyphenyl)-1 - piperazinyl]propoxy}benzophenone hydrochloride or | |
| 4 - bromo-4'-{3-[4-(p-chlorophenyl)-3,6-dihydro-1(2H) - pyridyl]-2-hydroxypropoxy}benzophenone hydrochloride | 25 |
| Lactose | 72 |
| Maize Starch | 2 |
| Calcium stearate | 1 |
| Per tablet | 100 |

The active substance is homogeneously mixed with the lactose and the maize starch, passed through a sieving machine, moistened wih water to form a paste and pressed through a No. 3 sieve (open mesh with 1.0 mm.). The granulate is dried, mixed with the calcium stearate and pressed to tablets.

EXAMPLE 4

Manufacture of dragées of the following composition:

|  | Mg. |
|---|---|
| 4 - [4 - (p-chlorophenyl)-3,6-dihydro-1(2H)-pyridyl) - 2 - hydroxypropoxy]-4'-chlorobenzophenone hydrochloride or | |
| 4 - bromo-4'-{3-[4-(p-chlorophenyl)-1-piperazinyl]-2 - hydroxypropoxy}benzophenone hydrochloride or | |
| 1 - {[p - (p-chlorobenzoyl)phenoxy]methyl}-2-[3,6-dihydro - 4-phenyl-1(2H)-pyridyl]-ethyl(p-chlorophenoxy)acetate or | |
| 4 - bromo-4' - {3 - [4-(p-bromophenyl)-3,6-dihydro-1(2H) - pyridyl] - 2-hydroxypropoxy} - benzophenone hydrochloride or | |
| 4 - chloro-4'-[3-(3,6-dihydro-4-phenyl-1(2H)-pyridyl - 2-hydroxypropoxy]benzophenone hydrochloride | 10 |
| Mannitol | 80 |
| Maize starch | 15 |
| Pregelatinized maize starch | 8 |
| Talcum | 2 |
| Per dragée kernel | 115 |

The active substance is mixed with the mannitol, the maize starch and the pregelatinized maize starch and passed through a No. 5 sieve (open mesh with 0.23 mm.). The mixture is moistened with water and pressed through a No. 3 sieve (open mesh with 1.0 mm.). The granulate is dried, mixed with the talcum and pressed to biconvex kernels. The kernels are coated with a sugar mixture consisting of 90 percent cane sugar, 5 percent rice starch and 5 percent talcum according to the usual dredging process.

We claim:

1. A chemotherapeutic composition comprising: as an active ingredient from about 0.5 mg. to about 50 mg. per dosage unit of a member selected from the group consisting of compounds of the formula

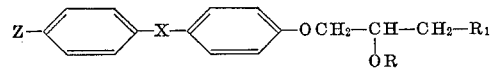

wherein Z is halogen or nitro; X is carbonyl, hydroxymethylene, di-lower alkoxymethylene or lower alkylenedioxy-methylene; R is hydrogen or an acyl radical selected from the group consisting of acetyl, phenoxyacetyl and parachlorophenoxyacetyl; and $R_1$ is a N-dihydropyridyl, N-tetrahydropyridyl or N-piperidyl group substitued in the para-position with phenyl, halophenyl or lower alkoxyphenyl and pharmaceutically acceptable acid addition salts thereof and a therapeutically inert pharmaceutically acceptable carrier material suitable for the oral or parenteral administration of medications.

2. A composition according to claim 1 wherein the active igredient is 4-chloro-4'-{3-[4-(p-chlorophenyl)-3,6-dihydro - 1(2H) - pyridyl]-2-hydroxypropoxy}benzophenone or a pharmaceutically acceptable acid addition salt thereof.

3. A composition according to claim 1 wherein the active ingredient is 4-bromo-4'-[3-(3,6-dihydro-4-phenyl-1(2H) - pyridyl)-2-hydroxypropoxy]benzophenone or a pharmaceutically acceptable acid addition salt thereof.

4. A composition according to claim 1 wherein the active ingredient is 4-bromo-4'-{3-[4-p-chlorophenyl)-3,6-dihydro- - 1(2H - pyridyl]-2-hydroxypropoxy}benzophenone or a pharmaceutically acceptable acid addition salt thereof.

5. A composition according to claim 1 wherein the active ingredient is 1 - {[p - (p-chlorobenzoyl)phenoxy]-methyl} - 2 - [3,6-dihydro-4-phenyl-1(2H)-pyridyl]ethyl-(p-chlorophenoxy)acetate or a pharmaceutically acceptable acid addition salt thereof.

6. A composition according to claim 1 wherein the active ingredient is rac.-4-bromo-4'-[3-(3,6-dihydro-4-phenyl - 1(2H) - pyridyl)-2-hydroxypropoxy]benzhydrol or a pharmaceutically acceptable acid addition salt or ketal thereof.

7. A composition according to claim 1 wherein the active ingredient is 4-fluoro-4'-{3-[4-(p-fluorophenyl)-3,6-dihydro - 1(2H) - pyridyl]-2-hydroxypropoxy}benzophenone or a pharmaceutically acceptable acid addition salt thereof.

8. A composition according to claim 1 wherein the active ingredient is 4-bromo-4'-{3-[4-(p-chlorophenyl)-3,6-dihydro - 1(2H) - pyridyl]-2-hydroxypropoxy}benzophenone or a pharmaceutically acceptable acid addition salt thereof.

9. A composition according to claim 1 wherein the active ingredient is 4-bromo-4'-{3-[4-(p-bromophenyl)-3,6-dihydro - 1(2H) - pyridyl-(2-hydroxypropoxy}benzophenone or a pharmaceutically acceptable acid addition salt thereof.

10. A composition according to claim 1 wherein the active ingredient is 4-chloro-4'-[3-(3,6-dihydro-4-phenyl-1(2H) - pyridyl)-2-hydroxypropoxy]benzophenone or a pharmaceutically acceptable acid addition salt thereof.

11. A composition according to claim 1 wherein the active ingredient is 4-{3-[4-(p-fluorophenyl)-3,6-dihydro-1(2H) - pyridyl] - 2 - hydroxypropyl}-4'-nitrobenzophenone or a pharmaceutically acceptable acid addition salt thereof.

12. A method for the treatment of subjects infected with *Mycobacterium tuberculosis* which comprises administering to said infected subjects via enteral or parenteral routes a chemotherapeutic composition comprising as the active ingredient from about 10 mg. to about 250 mg. per kilogram of body weight of a member selected from the group consisting of compounds of the formula

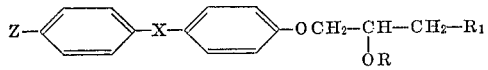

wherein Z is halogen or nitro; X is carbonyl, hydromethylene, di-lower alkoxymethylene or lower alkylenedioxymethylene; R is hydrogen or an acyl radical selected from the group consisting of, acetyl, phenoxyacetyl and para-chlorophenoxyacetyl; and $R_1$ is a N-dihydropyridyl, N-tetrahydropyridyl or N-piperidyl group substituted in the para-position with phenyl, halophenyl or lower alkoxyphenyl and pharmaceutically acceptable acid addition salts thereof and a therapeutically inert pharmaceutically acceptable carrier material suitable for the enteral or parenteral administration of medications.

13. A method according to claim 12 wherein the active ingredient is 4 - chloro-4'-{3-[4-(p-chlorophenyl)-3,6-dihydro - 1(2H)-pyridyl]-2-hydroxypropoxy}benzophenone or a pharmaceutically acceptable acid addition salt thereof.

14. A method according to claim 12 wherein the active ingredient is 4-bromo-4'-[3-(3,6-dihydro-4-phenyl-1(2H)-pyridyl) - 2 - hydroxypropoxy]benzophenone or a pharmaceutically acceptable acid addition salt thereof.

15. A method according to claim 12 wherein the active ingredient is 4-bromo-4'-{3-[4-(p-fluorophenyl)-3,6-dihydro - 1(2H) - pyridyl]-2-hydroxypropoxy}benzophenone or a pharmaceutically aid addition salt thereof.

16. A method according to claim 12 wherein the active ingredient is 1-{[p-(p-chlorobenzoyl)phenoxy]methyl}-2-[3,6 - dihydro - 4 - phenyl-1(2H-pyridyl]ethyl (p-chlorophenoxy)acetate or a pharmaceutically acceptable acid addition salt thereof.

17. A method according to claim 12 wherein the active ingredient is rac. - 4 - bromo-4'-[3-(3,6-dihydro-4-phenyl-1(2H)-pyridyl)-2-hydroxypropoxy]benzhydrol or a pharmaceutically acceptable acid addition salt thereof.

18. A method according to claim 12 wherein the active ingredient is 4 - fluoro-4'-{3-[4-p-fluorophenyl)-3,6-dihydro - 1(2H)-pyridyl]-2-hydroxypropoxy}benzophenone or a pharmaceutically acceptable acid addition salt thereof.

19. A method according to claim 12 wherein the active ingredient is 4 - bromo-4'-{3-[4-(p-chlorophenyl)-3,6-dihydro - 1(2H) - pyridyl] - 2-hydroxypropoxy}benzophenone or a pharmaceutically acceptable acid addition salt thereof.

20. A method according to claim 12 wherein the active ingredient is 4-bromo-4'-{3-[4-(p-bromophenyl)-3,6-dihydro - 1(2H) - pyridyl]-2-hydroxypropoxy}benzophenone or a pharmaceutically acceptable acid addition salt thereof.

21. A method according to claim 12 wherein the active ingredient is 4-chloro-4'-[3-(3,6-dihydro-4-phenyl-1(2H)-pyridyl)-2-hydroxypropoxy]benzophenone or a pharmaceutically acceptable acid addition salt thereof.

22. A method according to claim 12 wherein the active ingredient is 4-{3-[4-(p-fluorophenyl)-3,6-dihydro-1(2H)-pyridyl] - 2-hydroxypropoxy}-4'-nitrobenzophenone or a pharmaceutically acceptable acid addition salt thereof.

References Cited

UNITED STATES PATENTS 3,085,938  4/1963  Berger et al. _____ 167—65
3,178,420  4/1965  Palopoli et al. _____ 260—240

OTHER REFERENCES

Journal of Medicinal Chem., vol. 9, 1966, pages 804–808.

ALBERT T. MEYERS, Primary Examiner

A. J. ROBINSON, Assistant Examiner

U.S. Cl. X.R.
260—297; 424—267

PO-1050
(5/69)

UNITED STATES PATENT OFFICE
CERTIFICATE OF CORRECTION

Patent No. 3,515,788      Dated June 2, 1970

Inventor(s) Edenhofer, Ramuz and Spiegelberg

It is certified that error appears in the above-identified patent and that said Letters Patent are hereby corrected as shown below:

Column 10, line 70 "or ketal" should be deleted

Column 11, line 19 "hydroxypropyl" should be hydroxypropoxy

Column 12, line 4 "aid" should be acid

SIGNED AND SEALED
NOV 17 1970

(SEAL)
Attest:

Edward M. Fletcher, Jr.
Attesting Officer

WILLIAM E. SCHUYLER, JR.
Commissioner of Patents